United States Patent

Cutler et al.

[11] 4,318,281
[45] Mar. 9, 1982

[54] METHOD OF DYNAMICALLY BALANCING A FLEXIBLE TORQUE TRANSMISSION COUPLING

[75] Inventors: Donald B. Cutler, Warren; Dennis J. Corey, Youngsville, both of Pa.

[73] Assignee: Rexnord Inc., Milwaukee, Wis.

[21] Appl. No.: 152,906

[22] Filed: May 23, 1980

[51] Int. Cl.³ .............................................. F16C 3/00
[52] U.S. Cl. ...................................... 64/1 V; 64/10; 64/13
[58] Field of Search ..................... 64/13, 10, 1 V, 1 R

[56] References Cited

U.S. PATENT DOCUMENTS

| | | | |
|---|---|---|---|
| 1,934,597 | 11/1933 | Foppl | 64/1 V |
| 4,055,966 | 11/1977 | Fredericks | 64/13 |
| 4,064,708 | 12/1977 | Breads | 64/1 V |
| 4,114,472 | 9/1978 | Hornig | 64/1 V |
| 4,265,099 | 5/1981 | Johnson et al. | 64/13 |

Primary Examiner—Wendell E. Burns
Attorney, Agent, or Firm—Theresa F. Camoriano; Vance A. Smith

[57] ABSTRACT

A method of rigidifying the normally flexible joint of a flexible torque transmission coupling without the use of support arbors. The joint of the coupling is axially compressed to provide both angular and axial rigidity of the coupling prior to balancing in a conventional manner. The method of compressing the joint may be adapted to accommodate the particular coupling being balanced.

24 Claims, 8 Drawing Figures

METHOD OF DYNAMICALLY BALANCING A FLEXIBLE TORQUE TRANSMISSION COUPLING

BACKGROUND OF THE INVENTION

The present invention relates to a method of dynamically balancing a flexible torque transmission coupling without the use of support arbors.

Flexible torque transmission couplings are widely used to transmit power from the rotating shaft of a prime mover such as a motor to the rotating shaft of a driven member to accommodate relative misalignment of the shafts. Couplings of this type typically include a hub and a center member with a flexing element positioned therebetween and attached to both the hub and the center member to provide a flexible joint.

Flexible couplings are usually dynamically balanced by rotating them about an axis extending longitudinally through the coupling thus determining the amount and location of any imbalance in the coupling. Any imbalance can be compensated for by either removing material from the points of imbalance or adding weight at a location 180° from the point of imbalance.

In order to effectively and accurately dynamically balance flexible couplings it is essential that the normally flexible coupling be made both angularly and axially rigid. Previously known methods included the use of a support arbor placed through the coupling to make the coupling rigid. While this method has been widely used, it has several disadvantages.

Balancing couplings with support arbor requires that the arbor itself be balanced necessitating precision grinding of the arbor to prevent coupling imbalance due to imbalance or eccentricity of the arbor. Also, this prior technique required that the balancing be repeated with the position of the arbor being changed to offset the effects of tooling imbalance.

Accordingly, the object of the present invention to provide a method of dynamically balancing a flexible torque transmission coupling without employing support arbors.

SUMMARY OF THE INVENTION

The method of the present invention includes the step of compressing the normally flexible joint of a flexible torque transmission coupling rendering the joint both axially and angularly rigid. The particular method of making the normally flexible joint rigid depends upon the design of the coupling being balanced. With some couplings, the same hardware used during normal operation of the coupling may be used to compress the flexible joint while other designs may require the use of some additional hardware.

IN THE DRAWINGS

FIG. 1 is a cross-sectional view of a flexible torque transmission coupling having its flexible joint compressed in accordance with the principles of the present invention, FIG. 2 is a partially cutaway cross-sectional view of an alternative method of compressing the flexible joint of the coupling of FIG. 1, FIG. 3 is a partially cutaway cross-sectional view of another method of compressing the flexible joint of the coupling of FIG. 1, FIG. 4 is a partially cutaway cross-sectional view of still another alternative method of compressing the flexible joint of the coupling of FIG. 1, FIG. 5 is a cross-sectional view of another flexible torque transmission coupling having its flexible joint compressed in accordance with the principles of the present invention, FIG. 6 is a partially cutaway cross-sectional view of the coupling of FIG. 5 having its flexible joint compressed in accordance with an alternative embodiment of the present invention, FIG. 7 is a partially cutaway cross-sectional view of the coupling of FIG. 5 having its flexible joint compressed in accordance with another alternative embodiment of the present invention, and FIG. 8 is a partially cutaway cross-sectional view of the coupling of FIG. 5 having its flexible joint compressed in accordance with an alternative embodiment of the present invention.

DESCRIPTION OF THE PREFERRED EMBODIMENT

Figure 1:
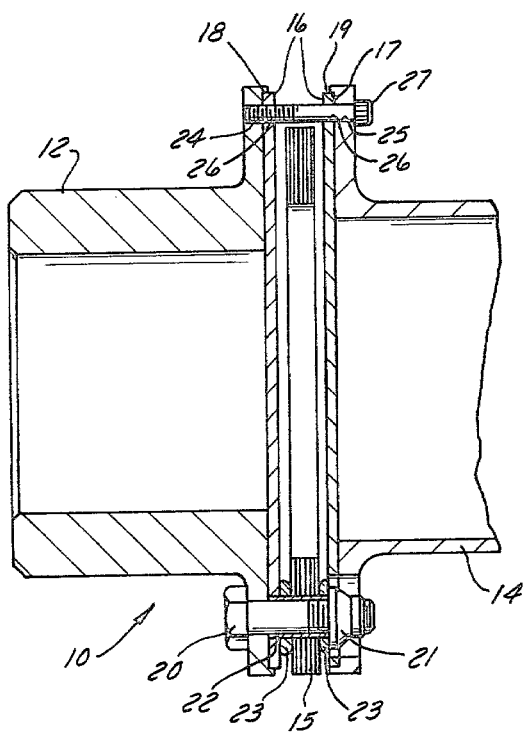

Referring now to FIGS. 1-4, there is shown a flexible torque transmission coupling 10 including a hub 12, a center member 14 and a flexing element 15. The flexing element 15 is alternately connected to the hub 12 and center member 14 by bolts 20 and nuts 21 in a manner well known to those skilled in the art to provide a flexible joint for accommodating axial misalignment when the coupling 10 is connected to the shafts of rotating driving and driven members. Pilot rings 16 are preferably provided to maintain balance of the coupling upon assembly. Spacers 23 may also be provided to position the flexing element between the two pilot rings 16 connected to the flexing element 15 by press fit bushings 22.

The coupling 10 shown in FIGS. 1-4 may be rigidified for dynamic balancing in accordance with the principles of the present invention by providing additional axially directed holes 24, 25, 26 through the hub 12, center member 14 and pilot rings 16 respectively through which capscrews 27 are placed to compress the flexing joint of the coupling 10. The compressed joint results in a coupling 10 that is both axially and angularly rigidified for dynamic balancing on a conventional machine.

Figure 2:
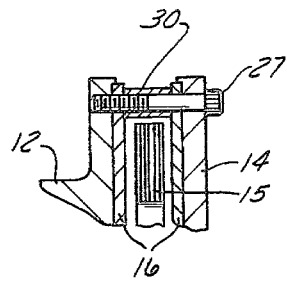
Figure 3:
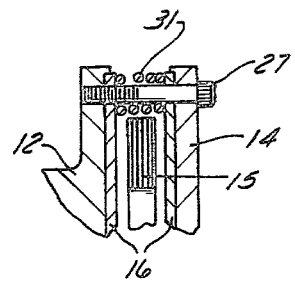

FIGS. 2 and 3 show alternative methods of rigidifying the normally flexible joint of the coupling 10 of FIG. 1. It will be readily understood that either bushing 30, as shown in FIG. 2 or spring 31, as shown in FIG. 3 may be positioned between the pilot rings 16 to provide the required rigidity to the flexible joint of the coupling 10.

Figure 4:
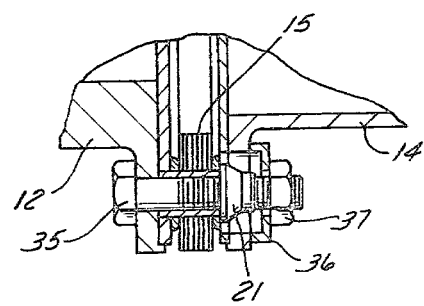

As shown in FIG. 4, the flexible joint may also be compressed, using the holes already in position during normal operation of the coupling 10. In this embodiment, bolt 20 is replaced by a longer bolt 35 that extends beyond the nut 21. Compression of the joint is accomplished by using a spacer washer 36 and another nut 37 engaged with the extended portion of the longer bolt 35. In this embodiment of the present method circumferentially alternate bolts 20 would be replaced with longer bolts 35 to rigidify the normally flexible joint of the coupling.

Figure 5:
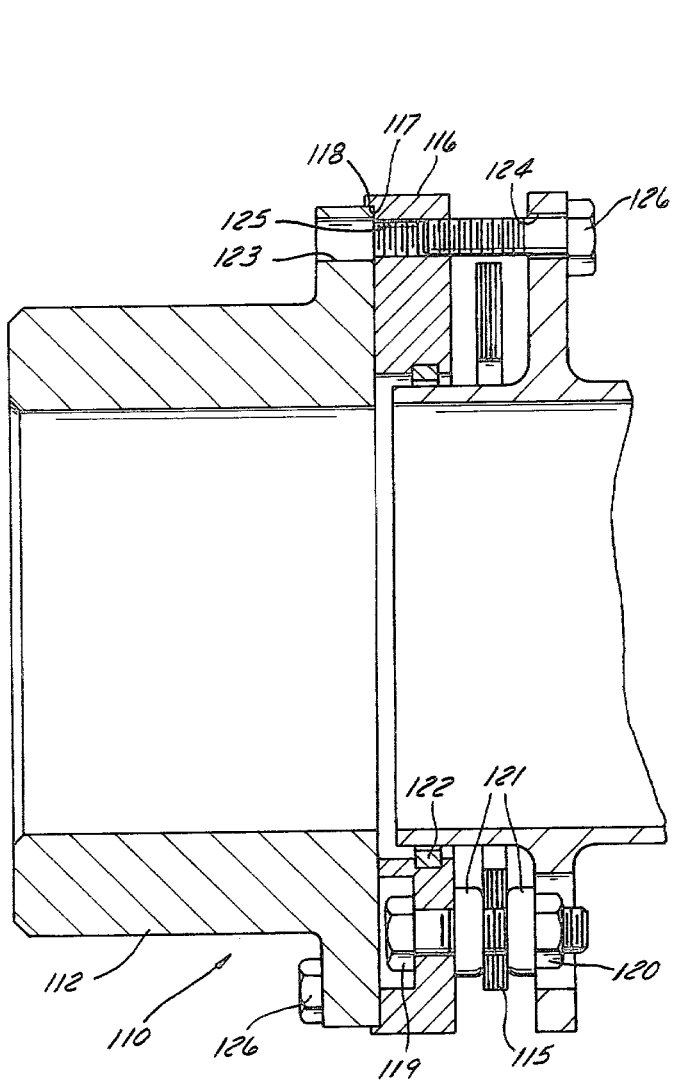
Figure 6:
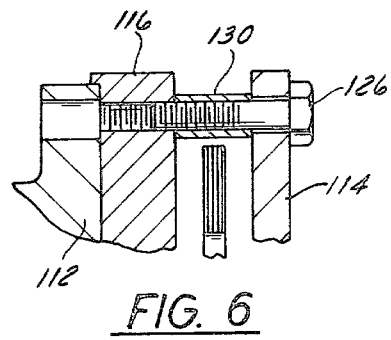
Figure 7:
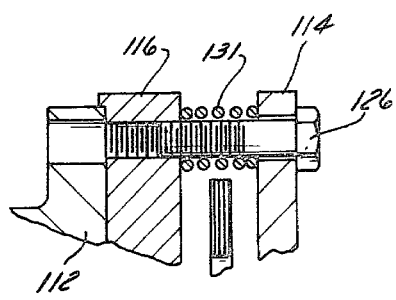

Referring now to FIGS. 5-8, there is shown another type of flexible torque transmission coupling 110 including a hub 112, a center member 114 and a flexing element 115 spaced between the center member 114 and the pilot ring 116. In this coupling holes 123, 124, 125 are already respectively positioned in the hub 112, center member 114 and pilot ring 116 for assembling and disassembling the pilot ring 116 as disclosed in co-pending U.S. Patent Application Ser. No. 135,051, filed Mar. 28, 1980. During normal operation, the capscrews 126 are positioned through the hub 112 and the pilot ring 116. FIGS. 5-7 show the position of one-half of the capscrews 126 when the coupling 110 is rigidified. Again, it will be readily understood that a bushing 130, as shown in FIG. 6, or a spring 131, as shown in FIG. 7, may be used to compress the flexible joint of the coupling 110 thereby rigidifying it for dynamic balancing in a conventional manner.

Figure 8:
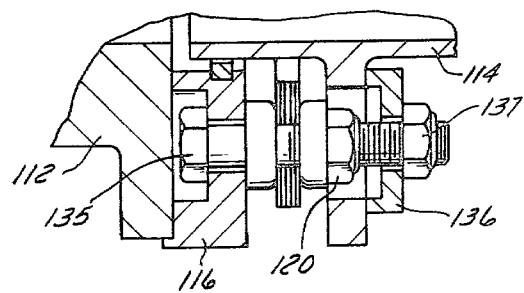

FIG. 8 shows the alternative method previously shown in FIG. 4 adapted for use with the coupling 110 of FIG. 5. Bolt 119 is replaced by longer bolt 135 having a portion axially extending beyond the center member 114 to accommodate a spacer washer 136 and another nut 137 to compress the normally flexible joint thereby rigidifying the coupling 110 both angularly and axially prior to dynamically balancing the coupling 110.

While several embodiments of the present invention have been disclosed and described herein, it is to be understood that modifications and variations may be made to a given type of flexible torque transmission coupling without departing from the scope of the invention as defined by the following claims.

We claim:

1. The method of rigidifying the normally flexible joint of a flexible torque transmission coupling comprising the step of axially compressing the joint of said coupling.

2. The method of rigidifying the normally flexible joint of a flexible torque transmission coupling as defined by claim 1, wherein said coupling includes a hub, a center member, and a flexing element positioned between said hub and said center member, said flexing element being alternatively connected to said hub and said center member by an even number of circumferentially spaced bolts and said compressing step comprises the steps of:
replacing one-half of said bolts with longer bolts having a portion thereof axially extending beyond the center member of said coupling,
positioning spacer washers and nuts on the extended portions of said longer bolts, and tightening said nuts to compress the normally flexible joint of said coupling.

3. The method of rigidifying the normally flexible joint of a flexible torque transmission coupling as defined by claim 1, wherein said coupling comprises a hub having a radially directed flange, a center member having a radially directed flange, and a flexing element positioned between said hub and said center member, said flexing element being alternately connected to the flanges of said hub and said center member by an even number of circumferentially spaced bolts and said compressing step comprises the steps of:
providing at least two axially directed circumferentially spaced holes in the flanges of said hub and said center member, said holes being axially aligned, positioning a fastening means through aligned pairs of said holes, and tightening said fastening means to compress the normally flexible joint of said coupling.

4. The method of rigidifying the normally flexible joint of a flexible torque transmission coupling as defined by claim 3 wherein the number of aligned pairs of holes in said flanges is equal to one-half the number of said circumferentially spaced bolts and said holes are spaced equidistant around the circumference of said flanges.

5. The method of rigidifying the normally flexible joint of a flexible torque transmission coupling as defined by claim 4 further comprising the step of placing a spacer means on said fastening means and between the flanges of said hub and said center member.

6. The method of rigidifying the normally flexible joint of a flexible torque transmission coupling as defined by claim 5 wherein said spacer means is a bushing.

7. The method of rigidifying the normally flexible joint of a flexible torque transmission coupling as defined by claim 5 wherein said spacer means is a spring.

8. The method of rigidifying the normally flexible joint of a flexible torque transmission coupling as defined by claim 1 wherein said coupling includes a hub having a radially directed flange, a center member having a radially directed flange, a flexing element positioned between said hub and said center member and a pilot ring positioned between said hub and said flexing element; said pilot ring and the flanges of said hub and center member having axially aligned circumferentially spaced holes therein and an even number of cap screws connecting said hub to said pilot ring for normal operation of said coupling, and said compressing step comprises the steps of:
removing one-half of said capscrews from their respective axially aligned, circumferentially spaced holes in the flange of said hub, positioning said one-half of said capscrews through the flange of said center member and said pilot ring, and
tightening said one-half of said capscrews to compress said normally flexible joint.

9. The method of rigidifying the normally flexible joint of a flexible torque transmission coupling as defined by claim 8 further comprising the step of positioning a spacer means on said one-half of said capscrews and between said pilot ring and said center member before positioning said cap screw prior to said tightening step.

10. The method of rigidifying the normally flexible joint of a flexible torque transmission coupling as defined by claim 9 wherein said spacer means is a cylindrical bushing.

11. The method of rigidifying the normally flexible joint of a flexible torque transmission coupling as defined by claim 9 wherein said spacer means is a spring.

12. The method of rigidifying the normally flexible joint of a flexible torque transmission coupling as defined by claim 8 wherein said flexing element is alternately connected to the flanges of said hub and said center member by an even number of axially directed bolts and said compressing step comprises the steps of:
replacing one-half of said bolts with longer bolts having a portion thereof axially extending beyond the flange of said center member of said coupling, positioning spacer washers and nuts on the extended portions of said longer bolts, and tightening said nuts to compress said normally flexible joint of said coupling.

13. In a method of dynamically balancing a flexible torque transmission coupling wherein the normally flexible joint of said coupling is rigidified prior to balancing said coupling, the improvement comprising the step of axially compressing the normally flexible joint of said coupling prior to said balancing step.

14. In the method of dynamically balancing a flexible torque transmission coupling as defined by claim 13 wherein said coupling includes a hub, a center member, and a flexing element positioned between said hub and said center member, said flexing element being alternatively connected to said hub and said center member by an even number of circumferentially spaced bolts and said compressing step comprises the steps of:

replacing one-half of said bolts with longer bolts having a portion thereof axially extending beyond the center member of said coupling, positioning spacer washers and nuts on the extended portions of said longer bolts, and tightening said nuts to compress the normally flexible joint of said coupling.

15. In the method of dynamically balancing a flexible torque transmission coupling as defined by claim 13, wherein said coupling comprises a hub having a radially directed flange, a center member having a radially directed flange, and a flexing element positioned between said hub and said center member, said flexing element being alternately connected to the flanges of said hub and said center member by an even number of circumferentially spaced bolts and said compressing step comprises the steps of:

providing at least two axially directed circumferentially spaced holes in the flanges said hub and said center member, said holes being axially aligned, positioning a fastening means through aligned pairs of said holes, and tightening said fastening means to compress the normally flexible joint of said coupling.

16. In the method of dynamically balancing a flexible torque transmission coupling as defined by claim 15 wherein the number of aligned pairs of holes in said flanges is equal to one-half the number of said circumferentially spaced bolts and said holes are spaced equidistant around the circumference of said flanges.

17. In the method of dynamically balancing a flexible torque transmission coupling as defined by claim 16 further comprising the step of placing a spacer means on said fastening means and between the flanges of said hub and said center member.

18. In the method of dynamically balancing a flexible torque transmission coupling as defined by claim 17 wherein said spacer means is a bushing.

19. In the method of dynamically balancing a flexible torque transmission coupling as defined by claim 17 wherein said spacer means is a spring.

20. In the method of dynamically balancing a flexible torque transmission coupling as defined by claim 13 wherein said coupling includes a hub having a radially directed flange, a center member having a radially directed flange, a flexing element positioned between said hub and said center member and a pilot ring positioned between said hub and said flexing element; said pilot ring and the flanges of said hub and center member having axially aligned circumferentially spaced holes therein and an even number of cap screws connecting said hub to said pilot ring for normal operation of said coupling, and said compressing step comprises the steps of:

removing one-half of said capscrews from their respective axially aligned, circumferentially spaced holes in the flange of said hub, positioning said one-half of said capscrews through the flange of said center member and said pilot ring, and tightening said one-half of said capscrews to compress said normally flexible joint.

21. In the method of dynamically balancing a flexible torque transmission coupling as defined by claim 20 further comprising the step of positioning a spacer means on said one-half of said capscrews and between said pilot ring and said center member before positioning said cap screw prior to said tightening step.

22. In the method of dynamically balancing a flexible torque transmission coupling as defined by 21 wherein said spacer means is a cylindrical bushing.

23. In the method of dynamically balancing a flexible torque transmission coupling as defined by claim 21 wherein said spacer means is a spring.

24. In the method of dynamically balancing a flexible torque transmission coupling as defined by claim 20 wherein said flexing element is alternately connected to the flanges of said hub and said center member by an even number of axially directed bolts and said compressing step comprises the steps of:

replacing one-half of said bolts with longer bolts having a portion thereof axially extending beyond the flange of said center member of said coupling, positioning spacer washers and nuts on the extended portions of said longer bolts, and tightening said nuts to compress said normally flexible joint of said coupling.

* * * * *